US008046440B2

(12) United States Patent
Breiter et al.

(10) Patent No.: US 8,046,440 B2
(45) Date of Patent: Oct. 25, 2011

(54) MANAGING RESOURCES THROUGH USER-FACING WEB SERVICES AGGREGATED IN PORTALS

(75) Inventors: Gerd Breiter, Wildberg (DE); Carsten Leue, Sindelfingen (DE); Frank Leymann, Aidlingen (DE); Thomas Schaeck, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 11/205,631

(22) Filed: Aug. 17, 2005

(65) Prior Publication Data
US 2006/0041641 A1    Feb. 23, 2006

(30) Foreign Application Priority Data
Aug. 19, 2004   (EP) ..................................... 04103978

(51) Int. Cl.
*G06F 15/173* (2006.01)
*G06F 15/177* (2006.01)
(52) U.S. Cl. ........................................ 709/220; 709/223
(58) Field of Classification Search .................. 709/220, 709/223, 227
See application file for complete search history.

(56) References Cited

U.S. PATENT DOCUMENTS

| | | | |
|---|---|---|---|
| 6,088,707 A * | 7/2000 | Bates et al. | 715/235 |
| 6,611,865 B1 * | 8/2003 | Perugini et al. | 709/224 |
| 7,370,364 B2 * | 5/2008 | Dobbins et al. | 726/28 |
| 2002/0149601 A1 * | 10/2002 | Rajarajan et al. | 345/619 |
| 2004/0015567 A1 * | 1/2004 | Ziebold et al. | 709/219 |
| 2005/0015465 A1 * | 1/2005 | Ziebold et al. | 709/219 |

OTHER PUBLICATIONS

Christensen, Erik, et al, "Web Services Description Language (WSDL) 1.1", Mar. 15, 2001, W3C, "http://www.w3.org/TR/wsdl", 1-49.*
http://searchwebservice.techtarget.com/sDefinition/o..sid26_gci521683.00.html; Web Services Description Language; downloaded Aug. 4, 2005; 3 pages.
http://www.w3.org/TR/wsdl; Web Services Description Language; downloaded Aug. 4, 2005; 49 pages.
http://www.drmaa.org/; Distributed Resource Management Application API Working Group (DRMAA-WG); downloaded Aug. 4, 2005, 3 pages.
http://looselycoupled.com/glossary/WSRP; WSRP; downloaded Aug. 4, 2005, 2 pages.
http://www.oasis-open.org/committees/tc_home.php?wg_abbrev=wsrp; Oasis Announcements; downloaded Aug. 4, 2005, 3 pages.

* cited by examiner

*Primary Examiner* — Larry Donaghue
*Assistant Examiner* — Brian J Gillis
(74) *Attorney, Agent, or Firm* — David A. Dagg

(57) ABSTRACT

The present invention relates to managing the administration of electronic resources accessible in an electronic network. Grid resources or services are enhanced with a presentation interface that provides an administration user-interface for configuring them. Resource-located logic configures the resource according to user inputs and actions imparted on user controls, which are sent from a respective resource to a portal server. On the portal server, a second user-interface software is implemented, able to aggregate the fragments or controls of different resources, to display such multiple controls to a user, to process user inputs imparted on those controls, and to send user control data entered via the user-interface fragments to a resource configuration interface of a respective one of the resources to perform the configuration of a respective resource via the respective resource configuration-interface.

15 Claims, 6 Drawing Sheets

MANAGING RESOURCES THROUGH USER-FACING WEB SERVICES AGGREGATED IN PORTALS

CROSS REFERENCE TO RELATED APPLICATIONS

The present application claims priority under 35 USC 119 to European Patent Application Number 04103978.5, filed Aug. 19, 2004.

FIELD OF THE INVENTION

The present invention relates to a method and respective system for managing the administration of electronic resources accessible in an electronic network.

BACKGROUND OF THE INVENTION

Distributed resources and services are key to e-business-on-demand infrastructures, which are increasingly required, when competing with the rapidly developing communication within electronic networks, and in particular the Internet.

In order to introduce the most relevant terms used for the present invention, the following explanations are given first:
  Resource
    Generalization for the consumption of CPU time, HD space, network bandwidth, applications, etc.
  Distributed Resource
    Resources that do not consume CPU, space, etc. on the same deployment as the client of the resource. Distributed resources often expose web services interfaces.
  Web Service
    Resource that exposes an interface that is accessible over a network, e.g. the Internet.
  Composite Service
    A service that adds value by orchestrating other services and/or resources.
  eBusiness-on-Demand
    Consists of compositions of a potentially large number of distributed resources.

WSRP is the abbreviation of Web Services for Remote Portlets, sometimes defined as "Dynamic plug-ins for portal pages". Officially ratified as an OASIS standard in September 2003, WSRP defines how to plug remote web services into the pages of online portals and other user-facing applications. This allows portal or application owners to easily embed a web service from a third party into a section of a portal page (a 'portlet'). The portlet then displays interactive content and services that are dynamically updated from the provider's own servers. Formerly known as Web Services for Remote Portals, WSRP is closely allied with WSIA (Web Services Interactive Applications).

The Web Services Description Language (WSDL) is an XML-based language used to describe the services a business offers and to provide a way for individuals and other businesses to access those services electronically. WSDL is the cornerstone of the Universal Description, Discovery, and Integration (UDDI)-initiative spearheaded by Microsoft, IBM, and Ariba. UDDI is an XML-based registry for businesses worldwide, which enables businesses to list themselves and their services on the Internet. WSDL is the language used to do this.

WSDL is derived from Microsoft's Simple Object Access Protocol (SOAP) and IBM's Network Accessible Service Specification Language (NASSL). WSDL replaces both NASSL and SOAP as the means of expressing business services in the UDDI registry.

The resources communicate with each other via data-oriented web services interfaces. More particularly, they provide data-oriented web service interfaces that allow client applications to access and use the interfaces. Composite services can be created and exposed as a new service that orchestrates existing services together. Each such service requires specific configuration that needs to be manageable by an administrator. Due to the possibly complex nature of the service the configuration process is generally also complex, demanding service specific business logic.

Approaching now to the focus of the present invention, creating a user-interface, further abbreviated as UI, for the management of such services is a complex task today because the UI portion (e.g. a prior art servlet or a portlet) needs to be specific for the service and needs to contain knowledge about the relationship of the configuration data it visualizes. If the UI portion is located on a different server than the resource itself, this tight coupling makes it hard to maintain and develop consistent and stable configuration U's. With the advent of e-business-on-demand infrastructures the number of services and resources that needs to be managed will become very large and dynamic. This makes the task of providing well integrated configuration UIs a tedious, if not impossible enterprise. A straight-forward way to solve this problem would be the definition of a set of interfaces and protocols that are suitable for representing configuration data and its internal semantic in a generic way. This would allow for the creation of generic U's for all types of configuration. However, such a protocol would be very complex. In addition, it could not account for resource or service specific UI requirements that cannot be expressed as relationship between data. An example is branding associated with the service.

The general problem underlying the present invention is thus as follows:

A human end-user needs to administer a series of remote resources of different kind that make up his grid. The end-user uses his UI platform, e.g. a desktop, a standard web browser or a portal server, as a front-end to the resources' administration UI.

The integration of service-specific UI elements according to prior art can be described as follows:

Each individual resource provides a resource specific UI-artifact that is installed onto the end-user's UI platform. In case this platform is a desktop based system, such an artifact could be a standalone application per single resource. The user needs to launch multiple applications, configure them with the identification of the remote resource (e.g. IP address and port) in order to administer the resource. The application uses a proprietary way to communicate the settings to the resource and displays the current settings using the desktop's widget set. In case the user is operating on a portal system the resource provides a resource-specific portlet. Although this portlet is integrated into the portal platform and thus participates in a common look-and-feel with other portlets, each resource requires its own administration portlet to be installed, because the portlet communicates in a proprietary way with the resource.

Both prior art scenarios have in common that there is a unique piece of software installed on the UI platform of the end user. If new resources get added to the e-business-on-demand infrastructure, respective new software needs to be installed on the UI platform. This fact tightly couples the topology of the e-business-on-demand infrastructure with the software basis on the UI platform, what imposes huge maintenance costs to keep both synchronized. In addition, updates to the remote resources can introduce new configuration options of these resources that in turn require software updates to the administration component. For large systems with hundreds of remote resources, such scenarios quickly become un-maintainable.

FIG. 1 depicts a respective prior art scenario. This Figure shows how distributed resources communicate with an UI framework by providing resource-specific administration UI artifacts. All artifacts are distinct and need to be installed on the UI framework.

The remote resources (above the horizontal line, in the "remote" area), i.e. a Shopping Web service 210, a composite Web service 220, a Supplier Web service 260, a Delivery Web Service 280 and a Rating Web Service 250 communicate with each other using data-oriented web services interfaces, denoted as "DATA/IF". Their plumbing forms the e-business-on-demand infrastructure. Each individual service however, needs administration, the "Shopping" service e.g. needs the setup of the offered products, the "delivery" service needs to be configured with the tracking database to user, the "composite" service contains information about the secondary services it orchestrates that need to be configured, etc.

The end user 240 uses a portal server 270 at the UI platform. In order to administer, i.e. manage e.g. the "Shopping" service 210 there needs to be a piece of code, e.g. a portlet be installed on the portal server 270 for this particular service, here denoted as the shopping proxy, 290. The administrator of the portal server needs to install this proxy 290 and update it, whenever the shopping service 210 is updated. In addition, as the administrator of the portal server 270 is in general different from the administrator of the e-business-on-demand infrastructure, both persons need disadvantageously to communicate and agree to an intended proposed maintenance or management action. The same is true for the administration work associated with the other services 220, 250, 260, 280 and their respective Administration Portlets 230, 265, 285, as far as they are depicted in the drawing.

According to prior art the administration of web services is achieved via a standardized, data-oriented API, as follows:

The Distributed Resource Management Application API (DRMAA) Working Group (see http://www.drmaa.org) has developed a specification that allows distributed resources to provide a data-oriented administration API, see the chapter: "Develop an API specification for the submission and control of jobs to one or more Distributed Resource Management (DRM) systems". The scope of this specification is all the high-level functionality, which is necessary for an application to consign a job to a DRM system including common operations on jobs like termination or suspension. The goal of this prior art specification is to facilitate the direct interfacing of applications to today's DRM systems by application's builders, portal builders, and Independent Software Vendors (ISVs). This prior art specification allows the development of UI-artifacts, UI fragments, controls, etc., that are common to many (probably all) distributed resources and use the DRMAA interface to communicate. In contrast to the approach discussed in the previous section, such a common administration interface reduces the maintenance effort on the UI side significantly. The common UI artifact only needs to be installed once on the UI platform. It still needs to be configured to administer each individual resource, although changes or updates in the resource do not require updates on the client side artifact, as a modification in administrable data is communicated via the DRMAA interface. The shortcoming of this solution, however, lies in the fact that generic administration UIs will not meet the requirements of all resources for the following reasons:

First, resource providers want branding elements in their UI. This type of information—as not related to the administrable properties of a resource—cannot be covered with the DRMAA management interface.

Second, resource providers have constraints in how the administrable data is presented to the end-user. While data-oriented constraints such as interdependencies between values can be expressed programmatically, constraints that require the use of specific UI elements cannot be expressed. For example, the temperature of a heating system must only be displayed using a slider control and not be displayed as an editable value, in order to provide for error-free and consistent data input.

Third, and even quite important, resource providers do not want to expose the administrable data directly, but only want to allow end-users to manipulate the data. Reasons reach from security considerations to the protection of intellectual property.

It is an objective of the present invention to offer a facility for the administration of network resources, which is easier to use and alleviates the shortcomings sketched out above.

SUMMARY OF THE INVENTION

In order to provide the correct understanding of the disclosed system the following definitions of terms is given:

An "interface" shall be understood as a specification for using a particular functionality programmatically, as e.g., the port type of a WSDL;

A "User Interface" is used in the commonly used sense of being the front-end for giving a user a chance to interact visually with an application run in a computer system;

A "User Interface fragment" is a part of the whole user Interface;

A "Resource" is a program logic that offers one or more "Interfaces" for using the program logic. In the context of the present invention those Interfaces are usable via a network.

Thus, the present invention is based on the idea that it is useful to add an interface, for example a WSRP, to the already existing interfaces available at a resource. Using this added interface a user-interface can be created, by which in turn the resource can be administered. This user-interface has properties that allow the creation of a new user-interface from the aggregation, or combination of a plurality of configuration user-interfaces.

Additionally, the idea is disclosed that the interface, which allows for accessing the user-interface, is automatically determinable, if the resource is known, e.g. by a respective ID. By this approach the advantage results that one is enabled to develop user-facing software for the purpose of visually—controlled administration of the resources without the requirement that the user facing software is resource-dependent. For example, that user-facing software may be portals accessible via a network, e.g., the Internet.

The before-mentioned user-interface is advantageously implemented as a web service user-interface at a web portal, for example. By that an administrator of a resource who is residing at a portal server is enabled to use the portal for administration of one or more resources by aid of the user-facing software provided by the present invention. Said user-facing software is generated in that the portal aggregates the configuration user-interfaces of a plurality of configurable resources. By that the portal-residing administration staff has the ability to configure this plurality of resources via a common access point and is not bound to the specific administration user-interfaces known in prior art, which are bound to a respective actual resource itself. So, the administrator of a resource and the administrator residing at the portal need not to cooperate together, the one residing at the portal needs no particular knowledge to manage the resource.

Basically, the user fragments mentioned in the disclosed system may be generated as follows:

A resource offers an additional interface, for example a WSRP markup-interface, via which a user-interface may be generated.

In this respect as will be further described in more detail with reference to FIG. 4 later below, first, the portal requests the UI interface from a resource, then at a beginning of a loop, sends a request against this interface. The resource answers by sending the description of the user-interface, which comprises information referring to the current status of the resource and information describing the controls, by which a user might interact and change the status of the resource.

Then the portal creates a user-interface, which aggregates the information of one or more of said user-interface descriptions.

Then the administrator of the resource interacts with the portal by using a particular of said sent controls. For example, he enters data into a respective control and sends that as part of an interaction request against the portal.

The portal receives the resource administrator's interaction request, assigns this request properly to the respective resource and sends in turn a respective further request via its configuration interface to the resource.

The resource receives the interaction request, derives therefrom which changes must be done to the resource, and executes those changes on the resource. Then the loop ends and might be restarted, as described above.

It should be understood that the particular form of the user-interface and that of the configuration interface is always dependent on the actual use and implementation.

As should be apparent from the above approach the advantage results that no separate Registry is required for determining the configuration interface of a requested resource, as the resource identity may be derived from the address of the resource itself, for example by the fact that the resource is identified by a port type definition in a WSDL.

The definition of user-interface fragments depends on the markup used to represent the remote UI. The basic requirement for these fragments is that the combination of more than one fragment results in a new valid fragment. The following section translates this requirement to common markups:

HTML (HyperText Markup Language) markup:

A fragment—see also FIG. 6—may contain all tags as defined in the HTML Specification, as maintained by the World Wide Web Consortium (W3C), such as, for example, the HTML 4.01 Specification (http://www.w3.org/TR/html401/) except the following:

BODY
FRAME
FRAMESET
HEAD
HTML
TITLE
BASE
LINK
META
STYLE

XHTML (extensible HyperText Markup Language) markup:

A fragment may contain all tags as defined in the XHTML Specification, as maintained by the World Wide Web Consortium (W3C), such as, for example, the XHTML™ 1.1—Module-based XHTML Specification (http://www.w3.org/TR/xhtml11/), except the following:

BODY
HEAD
HTML
TITLE
BASE
LINK
META
STYLE

More details are given later below in the description of the preferred embodiment.

The invention describes a mechanism that allows the administration of heterogeneous distributed resources in an e-business-on-demand infrastructure, and which offers an autonomous administration facility for a resource. In contrast to existing administration mechanisms the key idea of this invention is to allow the resources to directly provide user-interface elements instead of data oriented information only.

Due to its distributed nature, the present invention has a part, which is implemented at the portal server, and a second part implemented multiply at each respective resource.

Resources or Services are thus enhanced with a first interface—a presentation interface—that provides an administration UI for managing them, i.e. the administration UI of a distributed resource is provided by the server hosting the resource, or simply spoken the resource itself. This includes also the resource-located logic required to configure the resource according to the user inputs and actions imparted on user controls, which were sent from a respective resource to a portal server.

On this portal server a simple, generic second interface—a user-interface—software is implemented, which is able to aggregate or combine the fragments or controls of different resources, to display such multiple controls to a human person, to process user inputs imparted on those controls, and to send them back to the respective service presentation interfaces. This person achieves an overview on all connected resources and is able to manage them from the portal server, without a second person at the resource-site being necessary, as it is in prior art. This second user-interface may no more be resource-specific, but may be instead a generic proxy for any kind and type of resources, due to the fact that it does not contain anymore resource-specific code for managing a resource, but instead only code for processing user control inputs on a given, pre-stored pool of User-interface fragments, or artifacts. This pool contains how to interact with any kind of user controls, e.g. data input fields, check boxes, sliders, YES/NO-buttons, etc. This second user-interface need not contain program logic requiring knowledge about the nature and specification of a resource. So, it is resource-independent. Advantageously, it may aggregate and display multiple fragments of different resources in one or more embedding user-interface windows. When using WSDL, two or more different services are advantageously aggregated to a composite service by combining the WSDL of the respective services, as it will be shown later in more detail.

The advantages are as follows:

First, a change in available resources does not result in the duty to change the code at the second user-interface at the portal server, as this software is a pure data input/output logic, which may handle a basically infinite number of resources, and thus also may handle cases, in which resources of a pre-known type are added or deleted from the resources pool, or cases, in which new types of resources are added, as the system description thereof will of course be comprised of the utilities in the data I/O toolbox of the second generic user-interface. This results in more ease of use when resources are managed, as no human intervention is necessary at the resource site, as the resource itself contains any necessary logic for providing a consistent management in cooperation with other resources.

Second, no meta language covering the coupling requirements for different resources is required for exchanging configuration parameters for different resources, as pure and "silly" user inputs are transferred from the portal to the resource. Thus the flexibility is increased.

Third, branding elements containing complex graphics can easily be transferred from the resource to the admin portal server and be displayed at the portal interface to the attention of the administrating user.

The above-mentioned first presentation interface may advantageously be implemented as a user-facing, interactive, pluggable web service e.g. according to the OASIS Web Services for Remote Portlets (WSRP). See http://oasis-open.org/committees/wsrp/. A resource or service may expose multiple such presentation interfaces that may be used to visualize and interact with different UI aspects of the resource, but one of them is dedicated explicitly for administration purposes.

A mechanism is provided to detect the configuration port exposing the presentation interface for each service and/or resource. This is preferably done by adding a well-defined port to the WSDL describing the resource, i.e., the description of an administrable resource is extended by the port that provides the administration UI.

The administration UI of an individual resource or service is made available to users and/or administrators via a portal to integrate it seamlessly into their preferred UI environment.

WSRP version 2.0 will add the ability for different remote portlets to communicate with each other via an event-based system. Thus, even composite services requiring basically a combination and interaction of more than one portlet can be handled advantageously with WSRP version 2.0.

Thus, it is advantageously possible, to combine the administration user-interface of two or more subordinate resources to a combined administration user-interface.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 2:
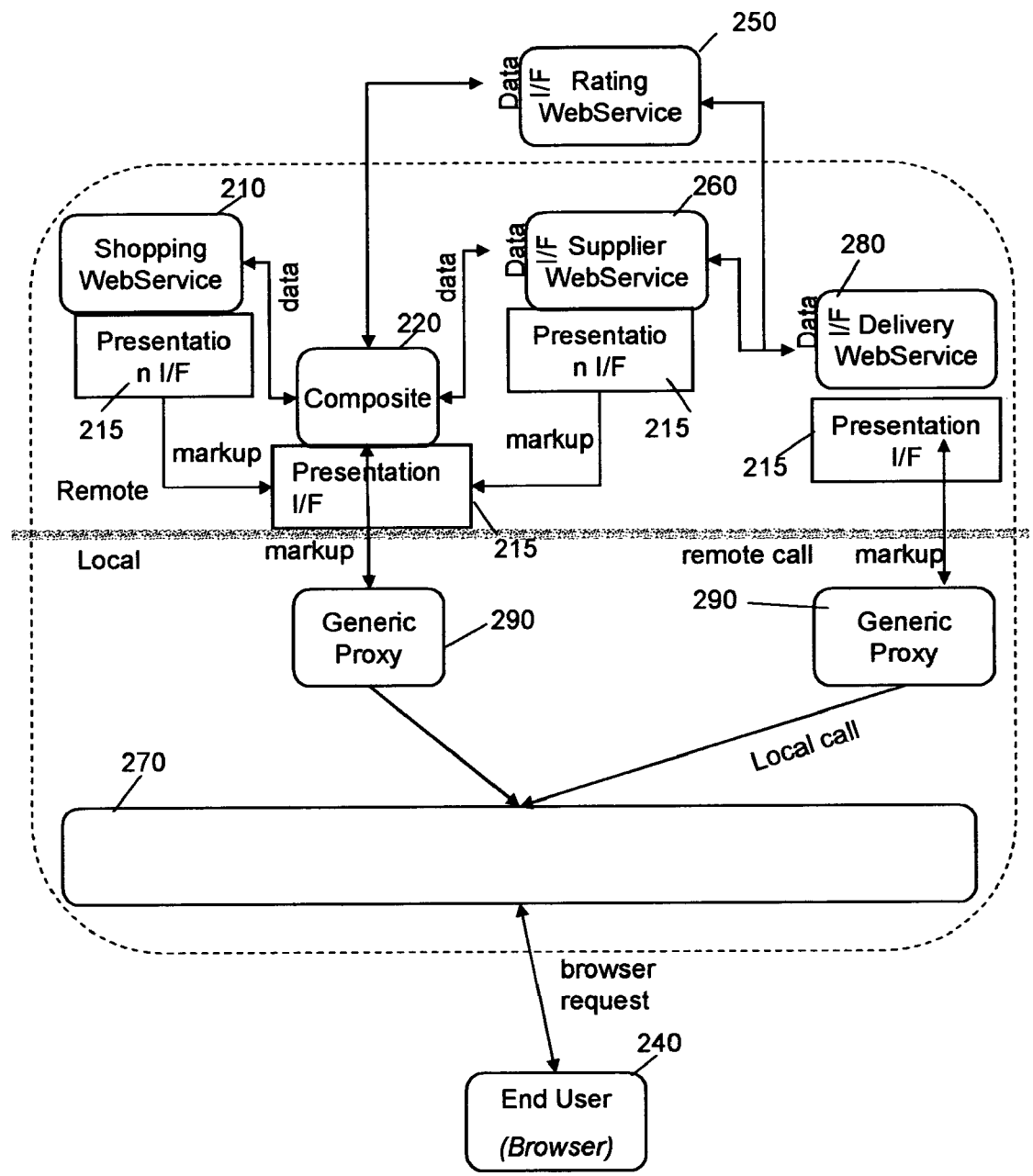
FIG. 2 is an illustration according to FIG. 1, enriched by the inventional elements.

With general reference to the figures and with special reference now to FIG. 2 the above-said inventional first presentation interface type is depicted in software implementations 215 at each of the different services 210, 250, 260, 280. Each program 215 provides an administration UI for managing the respective resource.

Further, the inventional second type aggregation logic is depicted at the portal server 270 as the Generic Proxys 290. The portals are thus enriched with above-said second software interface.

In more detail, the complete information about the configuration of a service or resource that consists of the configuration data, the semantic dependencies between this data and their optimal representation as a UI, are kept together tightly at the location of the service. The exploiter of the UI—the aggregating portal—only needs to deal with the visual and user-facing aspect of the configuration and does not need to know anything about the internal wiring. This keeps the exploiter simple and generic. In addition it is simple to adapt the UI portion of the configuration, if the configuration data or the semantic dependencies change, as everything is kept in one place.

As a person skilled in the art may appreciate, according to this preferred embodiment of the inventional method, each resource or service has an associated user-facing, interactive web service 215, providing the administration UI for it. It can now be plugged into portals and becomes easily integratable in a portal based management UI. Only one single generic adaptor, the software 290, is required to manage all types of resources and services generically (portlet proxy). As the configuration port is discoverable from the service itself without requiring further information there is no additional effort from using a service or resource to visually configure it.

If multiple services are orchestrated to form composite web services representing business processes, the portal can obtain and aggregate the management U's of the different services integrated in the business process to display administration pages for the business process.

The additional option to expose multiple presentation interfaces for different UI aspects enables a specific service or resource to act both as an end-user service as well as a service that can be orchestrated into a higher level service. Whereas the end-user UI would be displayed directly by a portal, the configuration UI would be used in conjunction by the compound service. However, the interfaces for both aspects are the same, which allows for simple and seamless integration.

Figure 1:
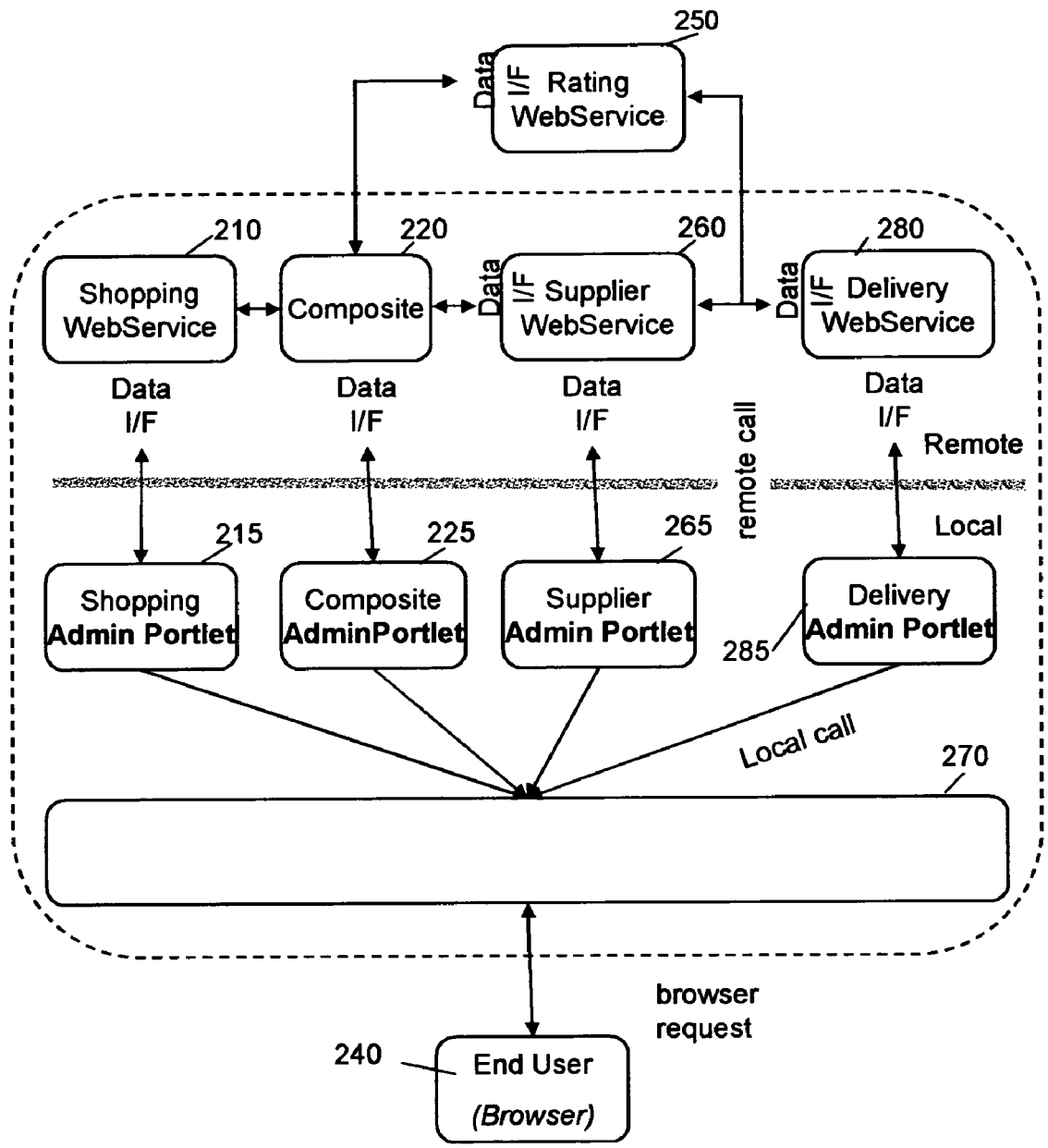
FIG. 1 is a schematic system diagram illustrating the essential structural elements in a prior art web services environment.

FIG. 2 also shows how distributed resources plug their own administration UI into the UI framework of the administrator. The generic proxy 290 (e.g. a WSRP proxy) plugs UI fragments provided by the resource itself into the UI framework. The difference with regard to FIG. 1 relates to the fact that proxies that plug into the UI framework do not generate the UI themselves (as in FIG. 1 on the basis of the metadata interfaces) but query readily prepared UI fragments from the remote services. They only communicate requests for UI display and UI interaction to the remote resource and feed the resulting UI fragment back into the UI framework. The proxies can thus be very simple and easily maintainable.

As a very relevant scenario, a UI framework is envisioned according to the invention on the basis of a portal server. Such a platform enables the integration of UI artifacts called "portlets" that represent applications, can be customized and directly interact with the end-user by means of a web-browser. The "Web Services for Remote Portlets" OASIS standard (WSRP, http://www.oasis-open.org/committees/tc_home.php?wg_abbrev=wsrp) provides a web services protocol that allows the transmission of UI fragments and defines how end-users communicate with the WSRP provider. WSRP defines four port-types for different levels of interaction. Compliant portal servers provide a "proxy-portlet" that on the one hand performs the remote communication to the WSRP provider and on the other hand implements the interfaces required to be integrated into the portal server. Typically this is the JSR168 interface. Portal servers that provide WSRP support already exist today, e.g. IBM's WebSphere Portal Server 5.0.2. It is preferred to use such a system as the basis for an implementation.

Distributed resources describe their functionality by interface specifications in the form of the "Web Services Description Language (WSDL)", a standardized XML document. This document contains information about the set of supported operations (port-types), information about how these operations are invoked (bindings), and information that combines port-types and bindings with the address of a concrete end-point, e.g., the IP address of a servlet for the case of an HTTP binding. A "service" consists of one or more ports.

An example for a distributed resource is the XMethods file-system service that provides access to a remote storage system:

```
<?xml version="1.0" ?>
- <definitions name="XMethodsFilesystemService"
targetNamespace="http://www.xmethods.net/sd/
XMethodsFilesystemService.wsdl"
xmlns:tns="http://www.xmethods.net/sd/
XMethodsFilesystemService.wsdl"
xmlns:xsd="http://www.w3.org/2001/XMLSchema"
xmlns:soap="http://schemas.xmlsoap.org/wsdl/soap/"
xmlns="http://schemas.xmlsoap.org/wsdl/">
....
- <service name="XMethodsFilesystemService">
    <documentation>Provides read, write, delete and list access to
XFS</documentation>
- <port name="XMethodsFilesystemPort"
binding="tns:XMethodsFilesystemBinding">
    <soap:address location="http://services.xmethods.net:80/
    soap/servlet/rpcrouter" />
  </port>
  </service>
</definitions>
```

Today there exists an administration UI in form of an HTTP page that allows the configuration of this resource (http://www.xmethods.com/xfs/). The address of the administration UI and the address of the service are completely uncorrelated, and an administrator would need to know both and keep this information synchronized. In addition, the static HTTP administration page cannot not be plugged into UI frameworks, especially if they use transport mechanisms other than HTTP.

On the basis of the present invention, the XMethods file system service may be extended by writing an additional service, like for example service 280 that provides an endpoint compliant at least with the WSRP base-services port type. The endpoint would be exposed, e.g. at the URL—
http://www.xmethods.xom/xfs/wsrp/jaxrpc/WSRPBaseService.

To allow clients of the file system service to discover the administration UI, the WSDL of the file system service would be enriched by the following statement:

```
<?xml version="1.0" ?>
- <definitions name="XMethodsFilesystemService"
targetNamespace="http://www.xmethods.net/sd/
XMethodsFilesystemService.wsdl/
xmlns:tns="http://www.xmethods.net/sd/
XMethodsFilesystemService.wsdl"
xmlns:xsd="http://www.w3.org/2001/XMLSchema"
xmlns:soap="http://schemas.xmlsoap.org/wsdl/soap/"
xmlns="http://schemas.xmlsoap.org/wsdl/">
....
- <service name="XMethodsFilesystemService">
    <documentation>Provides read, write, delete and list access to
XFS</documentation>
- <port name="XMethodsFilesystemPort"
binding="tns:XMethodsFilesystemBinding">
    <soap:address location="http://services.xmethods.net:80/soap/
    servlet/rpcrouter" />
  </port>
-
  <port name="WSRPBaseService"
  binding="bind:WSRP_v1_Markup_Binding_SOAP">
    <soap:address
  location="http://www.xmethods.xom/xfs/wsrp/jaxrpc/
  WSRPBaseService" />
  </port>
  </service>
</definitions>
```

Clients of the service now can simply perform a lookup if the service exposes the appropriate WSRP port. In this case a WSRP proxy portlet is automatically instantiated, configured with the endpoint from the service's WSDL, and added to the portal page that displays administrable artifacts. No installation of additional code on the portal platform is required. If the administration UI changes, the portal server will automatically incorporate these changes, because the UI fragments are requested from a remote location.

Figure 3:
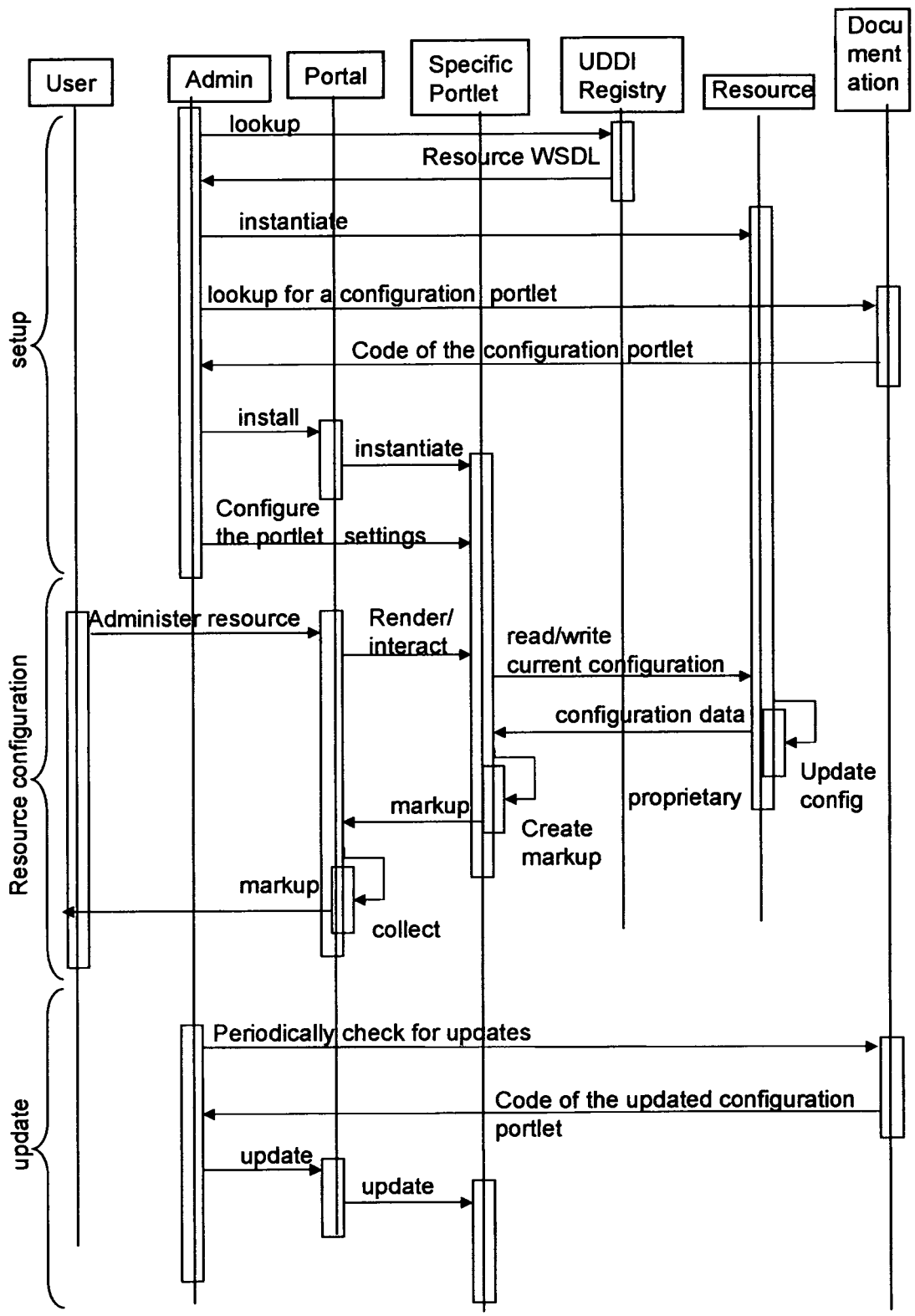
FIG. 3 is a control flow diagram, illustrating the essential steps in the control flow during prior art maintenance of resources.

FIG. 3 (prior art) and 4 (inventional) depict and illustrate the control flow of a remote resource administration task of systems that are implemented according to closest prior art and systems that are based on the present invention.

The administrative task consists of three phases, namely the integration of the remote resource and its configuration by an administrator (phase 1), the configuration of the remote resource by a user (phase 2) and an eventual update of the configuration interface by the administrator due to changes in the resource (phase 3).

FIG. 3 depicts the control flow for systems based on prior art.

Phase 1: The administrator does a lookup on a web services registry, e.g. a UDDI registry, to locate the appropriate service description. The result of the lookup is a WSDL file that contains the description of the resource's interface and the endpoint that implements this interface. The administrator uses this information to instantiate the resource and embeds it into the orchestration of services. The resource does not yet contain an UI to administrate it. The administrator consults the service's documentation, see also step 510 in FIG. 5, and downloads code of the appropriate configuration portlet that is able to connect to the resource and to generate an appropriate UI, see also step 520 in FIG. 5. This portlet is installed on the portal server, see also step 530 in FIG. 5, and is configured, step 540, to connect to the integrated resource.

Phase 2: An end user connects to the portal server and is presented with a UI that displays a collection of portlets. One of these portlets is the resource configuration portlet. It displays the current state of the resources by sending a request for configuration data via a proprietary protocol to the resource and by then generating markup that is presented to the end user. If the user interacts with the portlet to modify the configuration, the portlet receives the request, analyzes it and sends modified configuration data to the remote resource.

Phase 3: the administrator periodically checks for updates of the configuration portlet. If such an update is available, he downloads the updated code and updates the already installed code base in the portal system.

Figure 4:
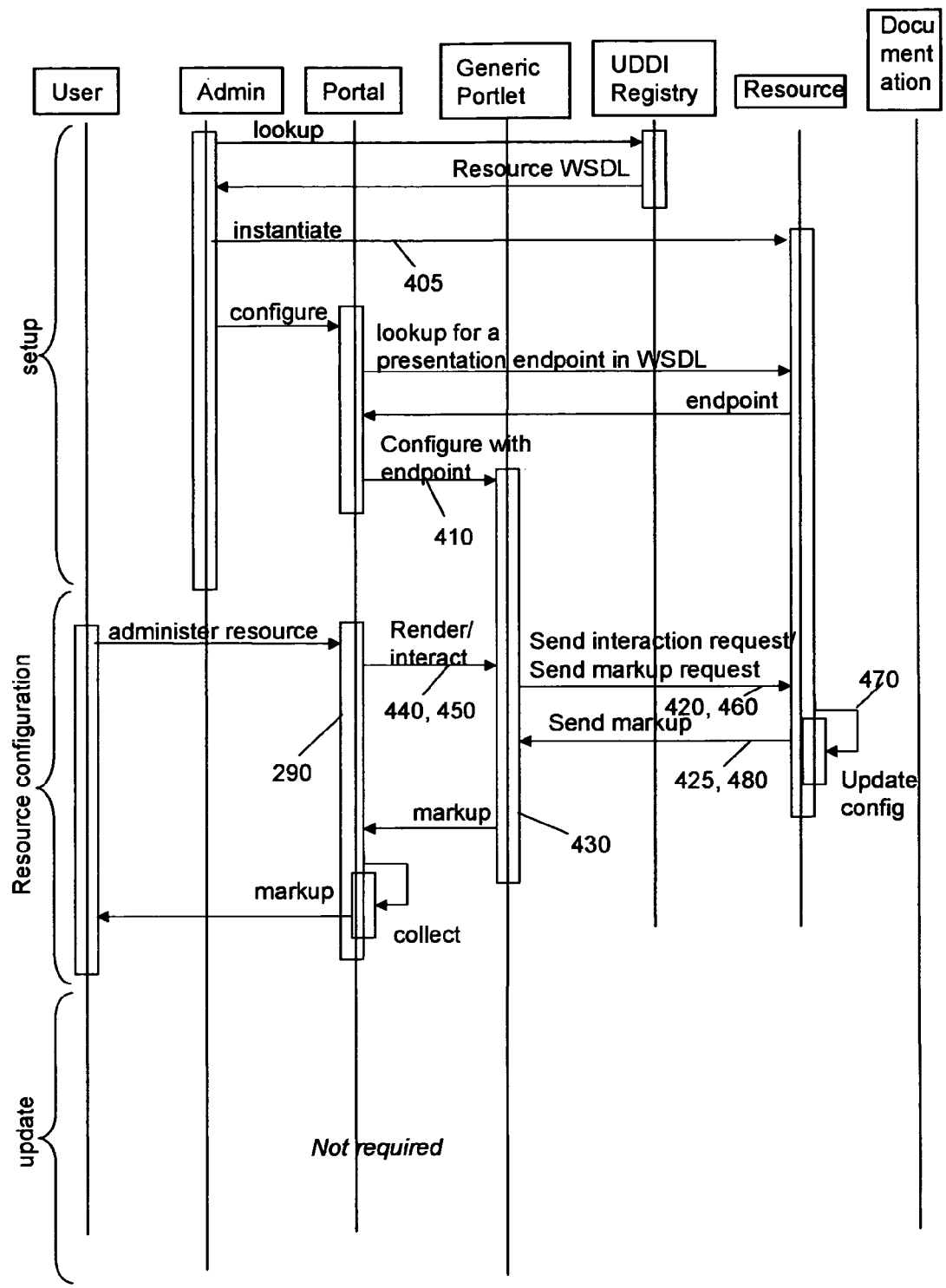
FIG. 4 is a representation according to FIG. 3 illustrating the inventional administration of resources.

FIG. 4 depicts the control flow in a system that incorporates an embodiment of the invention.

Phase 1: The administrator does a lookup on a web services registry, e.g. a UDDI registry, to locate the appropriate service description. The result of the lookup is a WSDL file that contains the description of the resource's interface and the endpoint that implements this interface. In addition the WSDL file contains the endpoint of the WSRP ports that can be used to access the configuration UI of the resource. The administrator uses this information to instantiate the resource, step 405, and embeds it into the orchestration of services. In addition, the administrator configures, step 410, an already existing—advantageously generic—portlet proxy to point to the configuration endpoint of the resource. A generic proxy 290 (see FIG. 2) may be used advantageously, because the configuration presentation endpoint uses a well known protocol.

Phase 2: An end user connects to the portal server and is presented with a UI that displays an aggregation 290 of portlets. One of these portlets is the resource configuration proxy portlet. It displays the current state of the resources by sending a request for markup to the resource, step 420. The resulting markup is sent back, step 425, and can advantageously be aggregated into the portal page without modification, step 430. If the user interacts with the portlet to modify the configuration, step 440, the portlet receives the request, step 450, and directly dispatches it to the resource without analyzing it, step 460. The resource itself receives and analyzes the request, updates the configuration, step 470, and returns updated markup, step 480.

Phase 3: Advantageously, no interaction of the administrator is required because no code has been installed on the portal server. Updates in the code base of the administration portlet are visible automatically.

Figure 5:
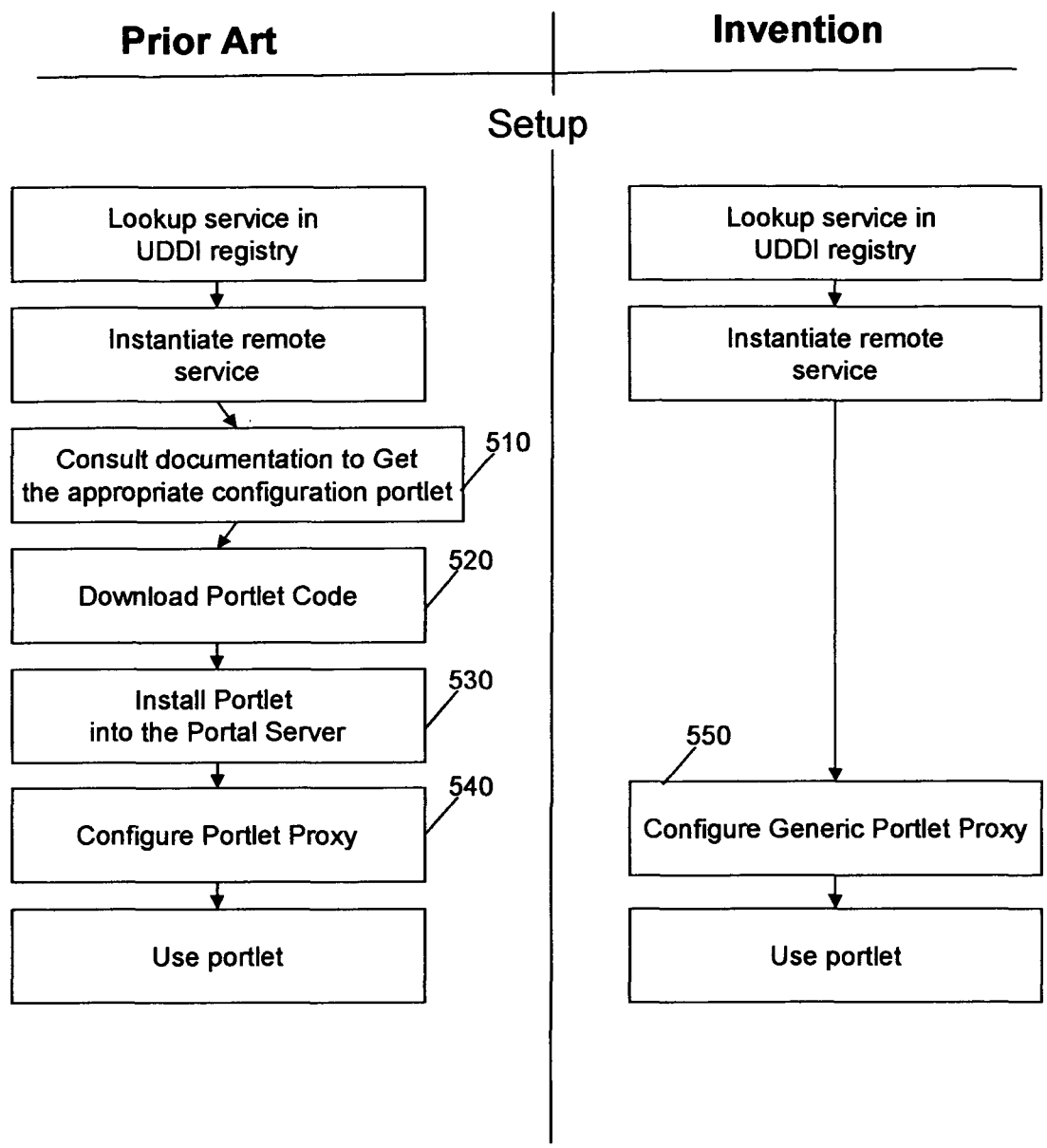
FIG. 5 is an overview representation illustrating the differences between prior art and inventional control flow.

FIG. 5 gives an overview on the differences in phases 1 and 2 described above with reference to FIGS. 3 and 4, in order to further show the advantages of the control flow simplified by the present invention. As shown in FIG. 5, the steps 510, 520 and 530 need not be performed according to this embodiment. Instead of configuring a portlet proxy specific for each service in prior art, a generic portlet proxy may be configured, which covers one or a plurality of services, step 550.

Figure 6:
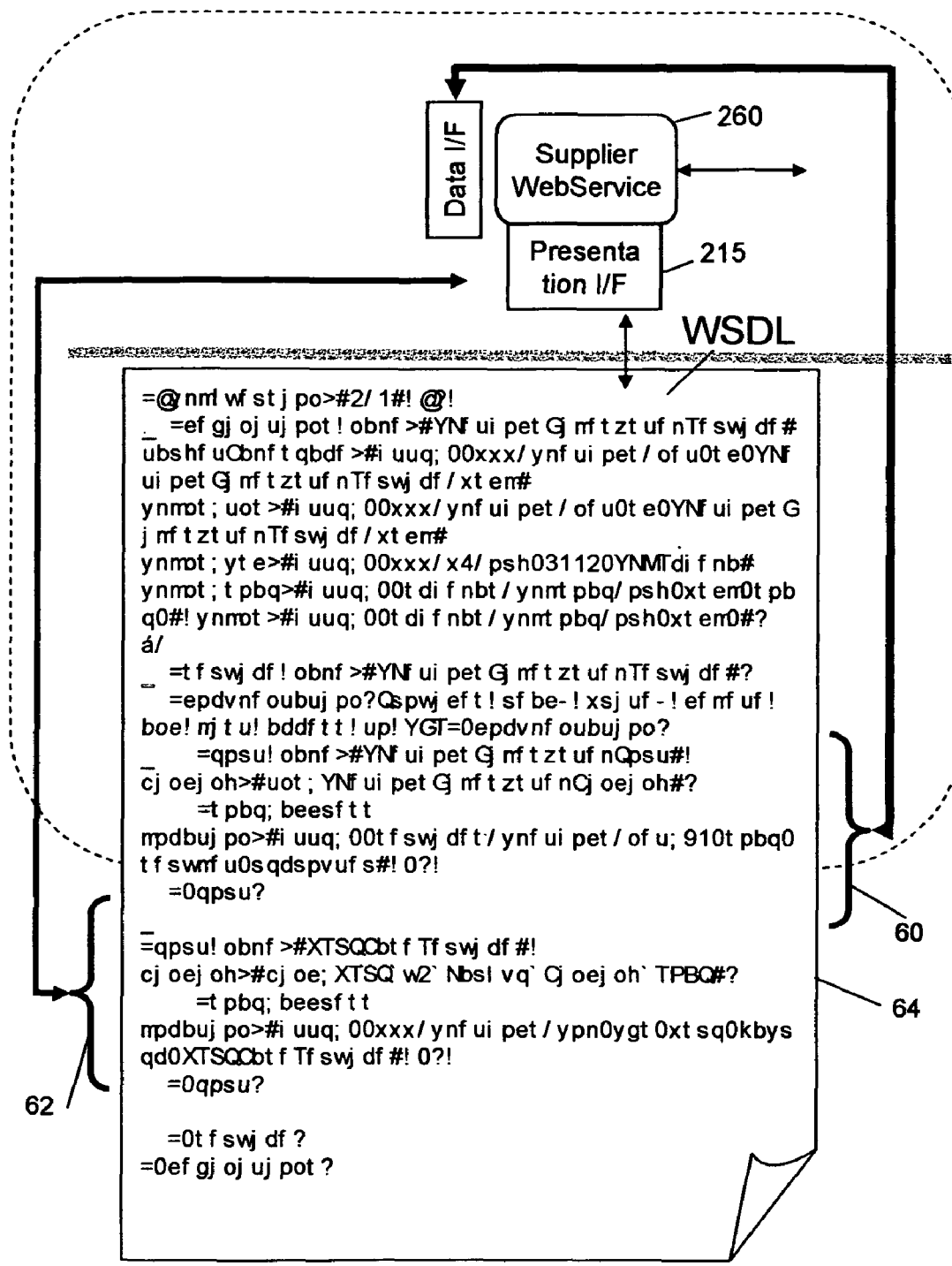
FIG. 6 depicts some details of the situation illustrated in FIG. 2 illustrating the enrichment of the resources' WSDL fragment in an exemplary form.

FIG. 6 depicts some details of the situation shown in FIG. 2, and illustrates the enrichment of a resources' WSDL fragment 64 in an example of the present invention given for the Supplier Web Service 260 and its Presentation Interface 215.

The state 60 describes the data interface of the resource, describing the prior art functionalities of the resource.

The Inventional Statement 62

```
<port name="WSRPBaseService"
  binding="bind:WSRP_v1_Markup_Binding_SOAP">
    <soap:address
  location="http://www.xmethods.xom/xfs/wsrp/jaxrpc/
  WSRPBaseService" />
    </port>
``` is inserted into the WSDL.

This endpoint comprised of statement 62 can be used to generate the UI-fragments and to communicate the interaction requests. The binding information in statement 62 points to a SOAP interface definition. This definition defines a method for retrieving markup (getMarkup in the WSRP case) and for communicating interaction requests (performInteraction in the WSRP case).

The Figures include flowchart illustration and block diagrams of methods, apparatus(s) and computer program products according to an embodiment of the invention. It will be understood that each block of the Figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A method for configuring a plurality of electronic resources accessible in an electronic network, characterized by the steps of:

receiving a plurality of user-interface fragments at a portal server sent from said plurality of electronic resources, wherein each of said plurality of user-interface fragments comprises a description of a user interface for respective one of said plurality of electronic resources including markup code usable to administer said respective one of said plurality of electronic resources and includes data for a visual representation of configuration data of said respective one of said plurality of electronic resources, and data for a visual representation of control data of said respective one of said plurality of electronic resources, said visual representation of said control data for initiating changes to said configuration data, wherein said changes are to be executed at said respective one of said plurality of electronic resources itself;

providing a user interface to an end user by aggregating said plurality of user interface fragments within a portal page at said portal server and sending said portal page to a Web browser associated with said end user; and receiving at said portal server user control data entered by said end user through said Web browser via said plurality of user-interface fragments within said portal page, said user control data for configuring respective ones of said plurality of electronic resources.

2. The method according to the claim 1, wherein said plurality of user-interface fragments are implemented according to the Web Services for Remote Portlets (WSRP) standard.

3. The method according to claim 1, wherein said plurality of user-interface fragments comprises markup elements such that a combination of more than one of said plurality of user-interface fragments results in a new valid fragment.

4. The method according to claim 3, wherein a plurality of eXtensible HyperText Markup Language (XHTML) tags are used, but excluding the following eXtensible Markup Language tags: BODY; HEAD; HTML; TITLE; BASE; LINK; META; STYLE.

5. The method according to claim 1, wherein a plurality of HyperText Markup Language (HTML) tags are used, but excluding the following HyperText Markup Language tags: BODY; FRAME; FRAMESET; HEAD; HTML; TITLE; BASE; LINK; META; STYLE.

6. The method according to claim 1, wherein functionality of each of said plurality of electronic resources is described by aid of a Web service description language (WSDL).

7. The method according to claim 1, implemented at least in part in a request-response-based form.

8. The method according to claim 7, wherein at least two different services are aggregated to a composite service by combining two of said plurality of user-interface fragments.

9. The method according to claim 8, further comprising combining administration user-interfaces of at least two subordinate resources to form a combined administration user-interface.

10. The method of claim 1, wherein at least one of said plurality of user interface fragments includes a branding element for display in said portal page, wherein said branding element is associated with a provider of a respective one of said plurality of electronic resources.

11. The method of claim 1, further comprising:
wherein each one of said plurality of user interface fragments is associated with a resource configuration interface of a respective one of said plurality of electronic resources;
sending said user control data entered by said end user through said Web browser via said plurality of user-interface fragments within said portal page from said portal server to said resource configuration interfaces of respective ones of said plurality of electronic resources;
receiving by said plurality of electronic resources control data entered into said plurality of user-interface fragments within said portal page; and
configuring said plurality of electronic resources according to said control data.

12. A portal server computer system including at least one processor and at least one computer readable storage medium having send/receive proxy program code stored thereon for, when executed, configuring a plurality of electronic resources accessible in an electronic network by performing the steps of:
receiving a plurality of user-interface fragments at said portal server sent from said plurality of electronic resources, wherein each of said plurality of user-interface fragments comprises a description of a user interface for a respective one of said plurality of electronic resources including markup code usable to administer said respective one of said plurality of electronic resources and includes
data for a visual representation of configuration data of said respective one of said plurality of electronic resources, and
data for a visual representation of control data of said respective one of said plurality of electronic resources, said visual representation of said control data for initiating changes to said configuration data, wherein said changes are to be executed at said respective one of said plurality of electronic resources itself;
providing a user interface to an end user by aggregating said plurality of user interface fragments within a portal page at said portal server and sending said portal page to a Web browser associated with said end user; and
receiving at said portal server user control data entered by said end user through said Web browser via said plurality of user-interface fragments within said portal page, said user control data for configuring respective ones of said plurality of electronic resources.

13. The portal server of claim 12, said steps further comprising:
wherein each one of said plurality of user interface fragments is associated with a resource configuration interface of a respective one of said plurality of electronic resources;
sending said user control data entered by said end user through said Web browser via said plurality of user-interface fragments within said portal page from said portal server to said resource configuration interfaces of respective ones of said plurality of electronic resources;
receiving by said plurality of electronic resources control data entered into said plurality of user-interface fragments within said portal page; and
configuring said plurality of electronic resources according to said control data.

14. A computer program product including a non-transitory computer readable storage medium having send/receive proxy program code stored thereon for, when executed, configuring a plurality of electronic resources accessible in an electronic network by performing the steps of:
receiving a plurality of user-interface fragments at said portal server sent from said plurality of electronic resources, wherein each of said plurality of user-interface fragments comprises a description of a user interface for a respective one of said plurality of electronic resources including markup code usable to administer said respective one of said plurality of electronic resources and includes
data for a visual representation of configuration data of said respective one of said plurality of electronic resources, and
data for a visual representation of control data of said respective one of said plurality of electronic resources, said visual representation of said control data for initiating changes to said configuration data, wherein said changes are to be executed at said respective one of said plurality of electronic resources itself;

providing a user interface to an end user by aggregating said plurality of user interface fragments within a portal page at said portal server and sending said portal page to a Web browser associated with said end user; and receiving at said portal server user control data entered by said end user through said Web browser via said plurality of user-interface fragments within said portal page, said user control data for configuring respective ones of said plurality of electronic resources.

15. The computer program product of claim 14, said steps further comprising:

wherein each one of said plurality of user interface fragments is associated with a resource configuration interface of a respective one of said plurality of electronic resources;

sending said user control data entered by said end user through said Web browser via said plurality of user-interface fragments within said portal page from said portal server to said resource configuration interfaces of respective ones of said plurality of electronic resources;

receiving by said plurality of electronic resources control data entered into said plurality of user-interface fragments within said portal page; and configuring said plurality of electronic resources according to said control data.

* * * * *